United States Patent
Pedersen et al.

(10) Patent No.: US 9,556,039 B2
(45) Date of Patent: Jan. 31, 2017

(54) VALVE FOR USE IN A WATER TREATMENT SYSTEM

(71) Applicants: Paul Michael Pedersen, Upper Marlboro, MD (US); Freddy Vidal, Chatsworth, CA (US)

(72) Inventors: Paul Michael Pedersen, Upper Marlboro, MD (US); Freddy Vidal, Chatsworth, CA (US)

(*) Notice: Subject to any disclaimer, the term of this patent is extended or adjusted under 35 U.S.C. 154(b) by 665 days.

(21) Appl. No.: 13/815,044

(22) Filed: Jan. 25, 2013

(65) Prior Publication Data

US 2013/0220911 A1    Aug. 29, 2013

Related U.S. Application Data

(60) Provisional application No. 61/633,281, filed on Feb. 7, 2012.

(51) Int. Cl.
| | |
|---|---|
| *B01D 29/00* | (2006.01) |
| *C02F 9/00* | (2006.01) |
| *F16K 3/00* | (2006.01) |
| *C02F 1/00* | (2006.01) |
| *F16K 11/044* | (2006.01) |
| *F16K 11/07* | (2006.01) |
| *E03C 1/02* | (2006.01) |

(52) U.S. Cl.
CPC .............. *C02F 1/001* (2013.01); *C02F 1/006* (2013.01); *F16K 11/044* (2013.01); *F16K 11/07* (2013.01); *C02F 2201/005* (2013.01); *E03C 1/023* (2013.01); *E03C 2201/30* (2013.01); *E03C 2201/40* (2013.01); *Y10T 137/87708* (2015.04)

(58) Field of Classification Search
None
See application file for complete search history.

(56) References Cited

U.S. PATENT DOCUMENTS

| | | | | |
|---|---|---|---|---|
| 4,038,189 | A * | 7/1977 | Dison et al. | 210/90 |
| 5,741,416 | A * | 4/1998 | Tempest, Jr. | 210/90 |
| 6,702,942 | B1 * | 3/2004 | Nield | 210/416.1 |
| 6,941,968 | B2 | 9/2005 | Vidal | 137/544 |
| 2004/0182457 | A1 | 9/2004 | Vidal | 137/625.31 |
| 2005/0139530 | A1 * | 6/2005 | Heiss | 210/85 |
| 2011/0248202 | A1 | 10/2011 | Vidal | 251/326 |

* cited by examiner

*Primary Examiner* — Nam Nguyen
*Assistant Examiner* — Richard Gurtowski
(74) *Attorney, Agent, or Firm* — Michael McGreal

(57) ABSTRACT

There is disclosed a unique water treatment system which incorporates a unique primary valve. The primary valve comprises an interconnected first part and second part. The first part attaches to a water source and provides untreated water to water treatment units which are controlled by the second part of the primary valve. Untreated water flows to a first water treatment unit and subsequently through a valve to the second part of the primary valve and to use or to a second water treatment unit. From the second water treatment unit the water flows to the second part of the primary valve and to use. The second part of the primary valve has a unique bore and slideable shaft valve structure. The water treatment units can purify the water and/or add substances to the water.

15 Claims, 4 Drawing Sheets

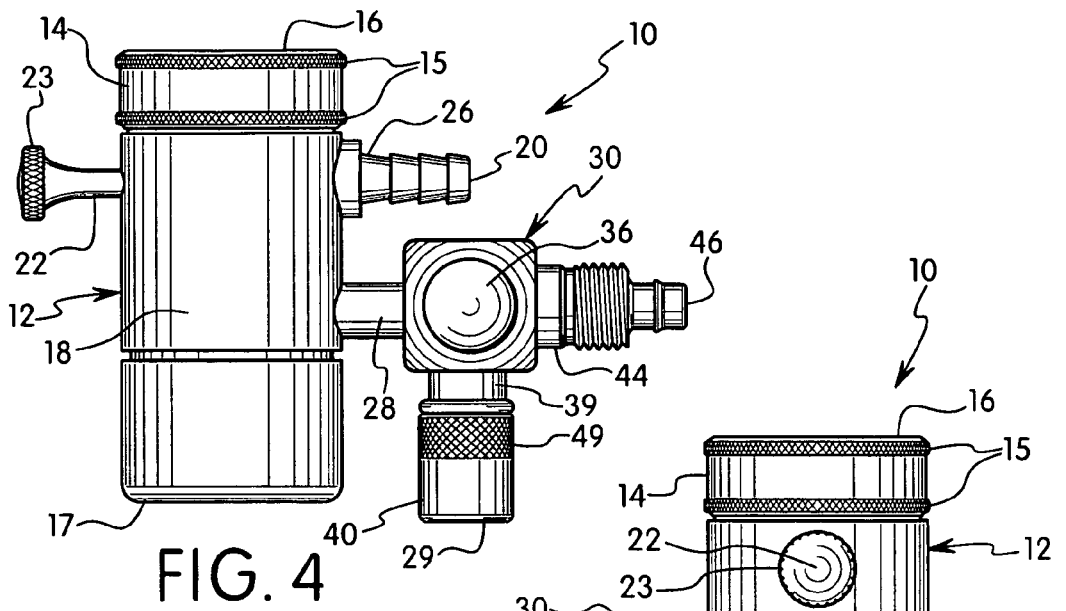
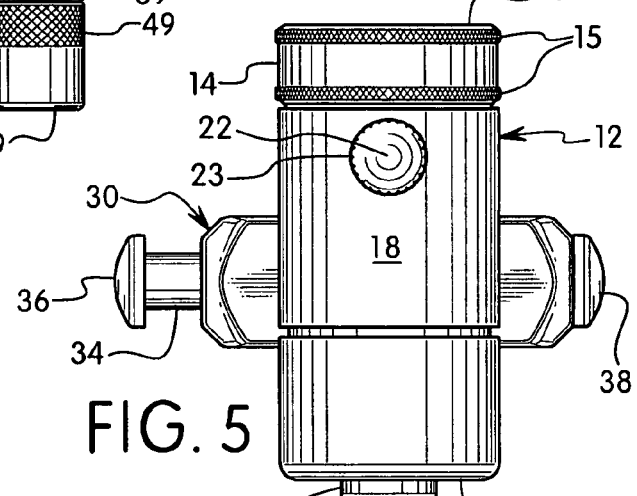
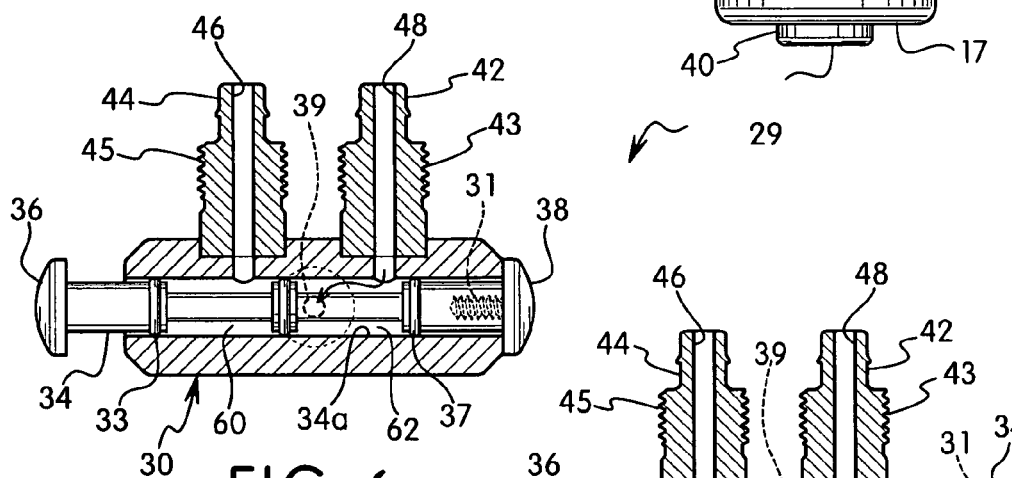
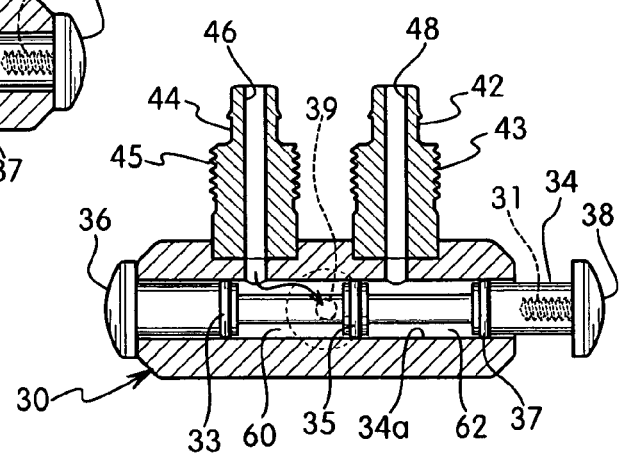

VALVE FOR USE IN A WATER TREATMENT SYSTEM

This application is a continuation of U.S. Application 61/633,281 filed Feb. 7, 2012 which is incorporated herein by reference in its entirety.

BACKGROUND OF THE INVENTION

The present invention is directed to a valve for use in water treatment systems where an input water can be diverted to optionally be treated more than one time. More particularly the input water can be subject to at least two purification steps or optionally to at least one purification step and at least one substance additive step, or two substance addition steps.

In most of the home water purification systems the water will undergo a single treatment step. This usually will be a water purification step. In such systems there is a valve with a set flow of water from a water source, such as a spout at a sink. At the spout water source there usually is a diverter valve where the water can be diverted and passed to the purification step or it can be flowed directly into the sink. The water would be flowed into the sink in the instances where the water would be used for cleaning purposes such as countertop, dish or pan or pot cleaning. Also the water would be flowed directly into the sink when the water would be used for watering plants. When for personal use, the water diverted to purification usually would be flowed to a single purification step and then to use. That is, the water is flowed directly from a purification step to use. These purification steps will remove particulates and various dissolved substances. These systems use a simple one part diverter valve. Such a one part diverter valve is used on the present water purification products available from Western Water International, Inc. of Forestville, Md. and available under the AQUASPACE trademark.

The present invention is directed to a water treatment system that besides having a water purification step, also optionally has an additional water treatment step. After the water flows through the water purification step it can be flowed directly to use or it can be flowed to an optional second treatment step. This optional second treatment step usually is in a series arrangement with the first purification step. Between the first step purification step and the second treatment step there is a T-junction valve. This T-junction valve is operated in conjunction with a unique primary diverter valve that is attached to a water source, such as a spout. This primary diverter valve besides having in a first part for flowing the source water directly to use or to a purification step, can in a second part receive diverted the water either from the water purification step or the water purification step and an additional water treatment step. The present system provides the versatility to flow water directly to use, flow the water to a purification step, or flow the water from the purification step to an additional water treatment step such as a substance addition step. In the second part of the diverter valve there is an input channel from the water purification step and separate input channel from the water treatment step such as a substance addition step. This second stage has a valve, such as a slider valve, with a plurality of inlet channels and an outlet channel. The outlet channel flows the water to ultimate use. The inlet channels are arranged to be in alignment either with the inlet from the water purification step or the inlet from the water treatment step such as a substance addition step. When in an alignment with the water purification step, water from the water purification step will flow through the second part of the diverter section and to the outlet channel for use. When in an alignment with a substance addition step, water from the substance addition step will flow through the second part of the primary valve and to the outlet channel for use. This two part primary valve provides for the versatility of having the water undergo a single or multiple treatment steps.

BRIEF SUMMARY OF THE INVENTION

The invention comprises a primary valve for use in a water treatment system being comprised of a valve body, the valve body having a first part and a second part, the first part and the second part being interconnected. The first part being comprised of an inlet for untreated water and an outlet for untreated water and a diverter section to allow the untreated water entering the first part to be diverted to a conduit connecting to the water treatment system. The second part having at least a first channel and a second channel for receiving treated water from the water treatment system, the second part incorporating a slideable shaft valve and an outlet for treated water, the slideable shaft valve connecting at least one of the at least a first channel and a second channel to an outlet for treated water of the second part. The first part inlet for water has a structure for attaching the first part to a source of water such as sink faucet outlet.

The second part is comprised of an elongated section, the elongated section containing the slideable shaft valve, the slideable shaft valve moveable at least from a first position to a second position, in a first position the slideable shaft valve connecting one of the at least a first and a second channel to the outlet for treated water and in another position connecting another of the at least first and second channels to the outlet for treated water.

A primary valve wherein the elongated section has therein a bore and a slideable valve shaft, the bore being in communication with the at least one of a first and second channel and the outlet channel for treated water. The slideable shaft valve has an elongated structure with a seal adjacent each end and a seal between the seals adjacent each end, this latter seal being at about a midpoint between the seals adjacent each end. Additionally the slideable shaft valve has an end gripping member on each end.

The invention additionally comprises a water treatment system incorporating the primary valve. The water treatment system comprises at least a first water treatment unit and a second water treatment unit, a primary valve for controlling the flow of treated water from the first water treatment unit and the second water treatment unit, and a secondary valve connecting the at least a first water treatment unit and the at least a second water treatment unit. The primary valve is comprised of a valve body, the valve body having a first part and a second part, the first part and the second part being interconnected. The first part is comprised of an inlet for untreated water and an outlet for treated water, the first part having a diverter section to allow the untreated water entering the first part to be diverted to a channel connecting to at least the first water treatment unit. The second part having at least a first channel and a second channel for receiving treated water from at least the first water treatment unit or the at least second water treatment unit, the second part incorporating a slideable shaft valve and an outlet for treated water, the slideable shaft valve connecting at least one of the at least a first channel and a second channel to the outlet for treated water.

The secondary valve is a T-valve which receives treated water from the at least first water treatment unit and flows this treated water to one of the primary valve or the at least one second water treatment unit. The first conduit via the T-valve can be connected to the primary valve with treated water flowing directly to the outlet for treated water.

The second channel can be connected to the T-valve with treated water from the first water treatment unit flowing through a conduit to the second water treatment unit and into the second channel, and subsequently flowing to the outlet channel for treated water.

The second part is comprised of an elongated section, the elongated section containing the slideable shaft valve, the slideable shaft valve moveable at least from a first position to a second position, in a first position the slideable shaft valve connects one of the at least a first and a second channel to the outlet channel for treated water and in another position connects another of the at least first and second channels to the outlet channel for treated water.

The elongated section has therein a bore and a slideable shaft, the bore being in communication with the at least a first and second channel and the connected outlet for treated water. The elongated section preferably has a seal adjacent each end and a seal between the seals adjacent each end.

The first water treatment step usually will remove substances from the untreated water with the second water treatment unit adding at least one substance to water from the first water treatment unit.

Optionally, the first water treatment unit can add at least one substance to the untreated water and the second water treatment unit can add a second substance to the water from the first water treatment unit.

Additionally, the first water treatment unit can remove at least one substance from the untreated water and the second water treatment unit can remove a second substance from the water from the first water treatment unit.

BRIEF DESCRIPTION OF THE DRAWINGS

FIG. 4 is a side elevation view of the primary valve of FIG. 1.

FIG. 5 is a front elevation view of the primary valve of FIG. 1.

FIG. 6 is a cross-sectional view of the second part of the primary valve of FIG. 1 showing the receipt of treated water from one of the water treatment units.

FIG. 7 is a cross-sectional view of the second part of the primary valve of FIG. 1 showing the receipt of treated water from another of the water treatment units.

DETAILED DESCRIPTION OF THE INVENTION

The invention will be described in more detail in its preferred embodiments with reference to the drawings. The primary valve and the water treatment systems utilizing the primary valve are described in detail. It is to be understood that these preferred embodiments of the inventions may be modified in various ways, however all such modifications are considered to be within the present invention.

Figure 1:
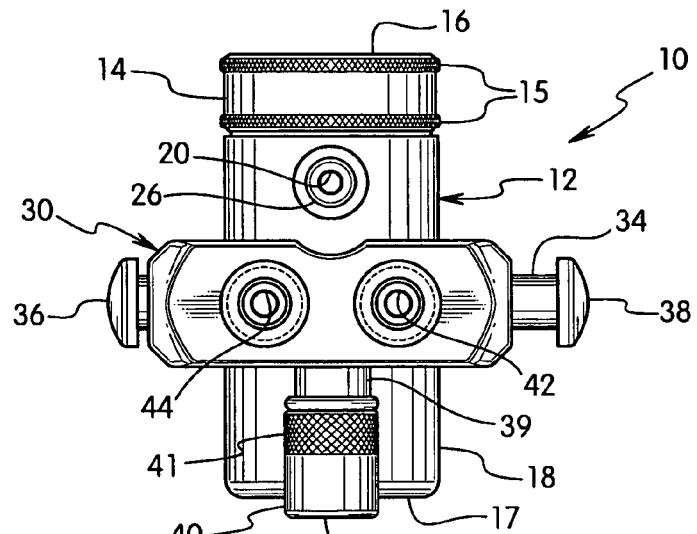
FIG. 1 is a rear elevation view of the primary valve showing the valve body of the first part and the second part.
Figure 2:
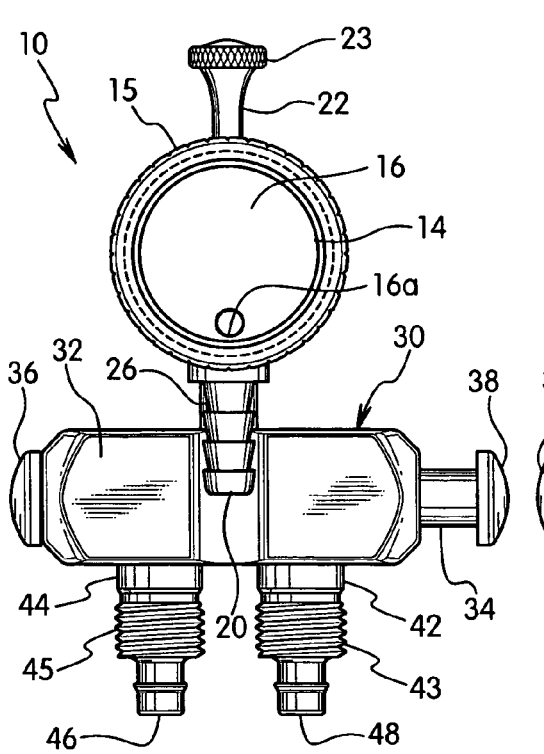
FIG. 2 is top plan view of the primary valve of FIG. 1.
Figure 3:
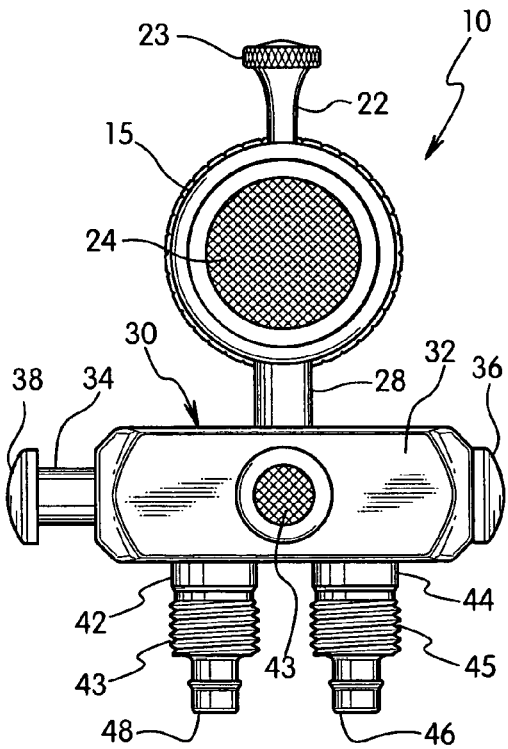
FIG. 3 is a bottom plan view of the primary valve of FIG. 1.
Figure 8:
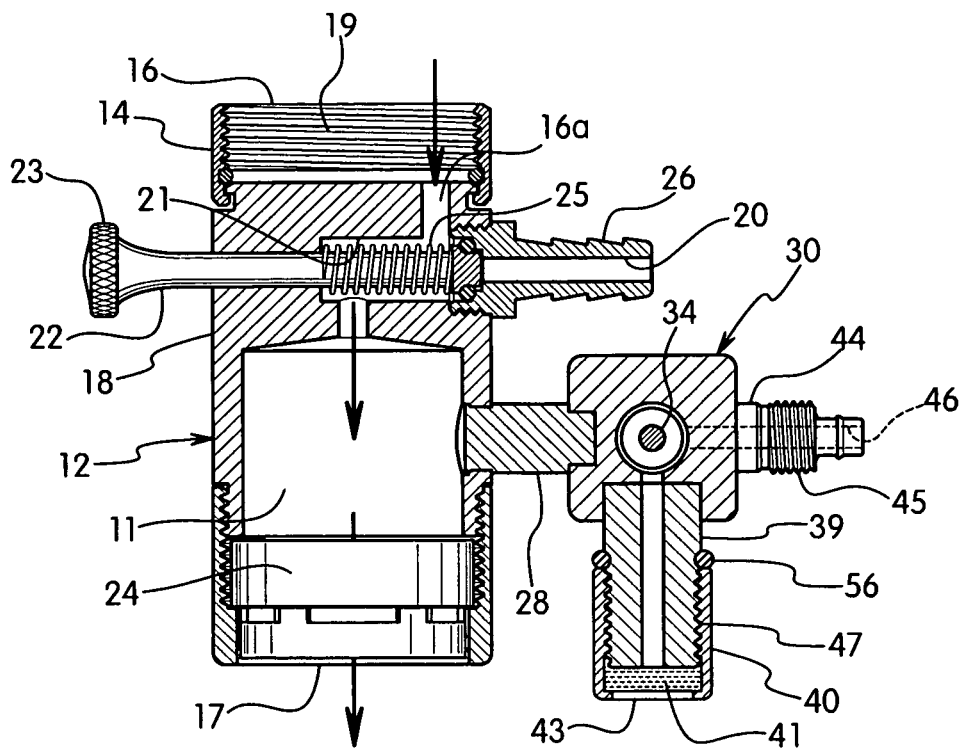
FIG. 8 is a cross-section of the primary valve showing the first part receiving water and flowing the water directly through the primary valve.
Figure 9:
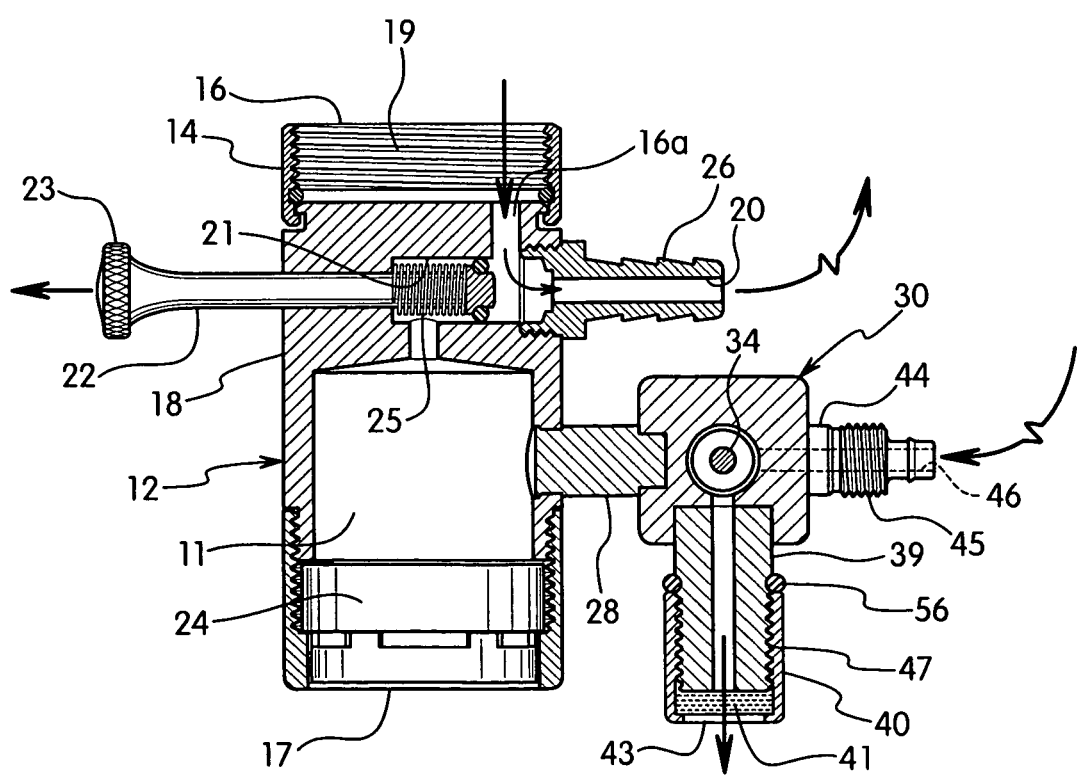
FIG. 9 is a cross-section of the primary valve showing the first part receiving water and flowing the water to the second part of the primary valve.
Figure 10:
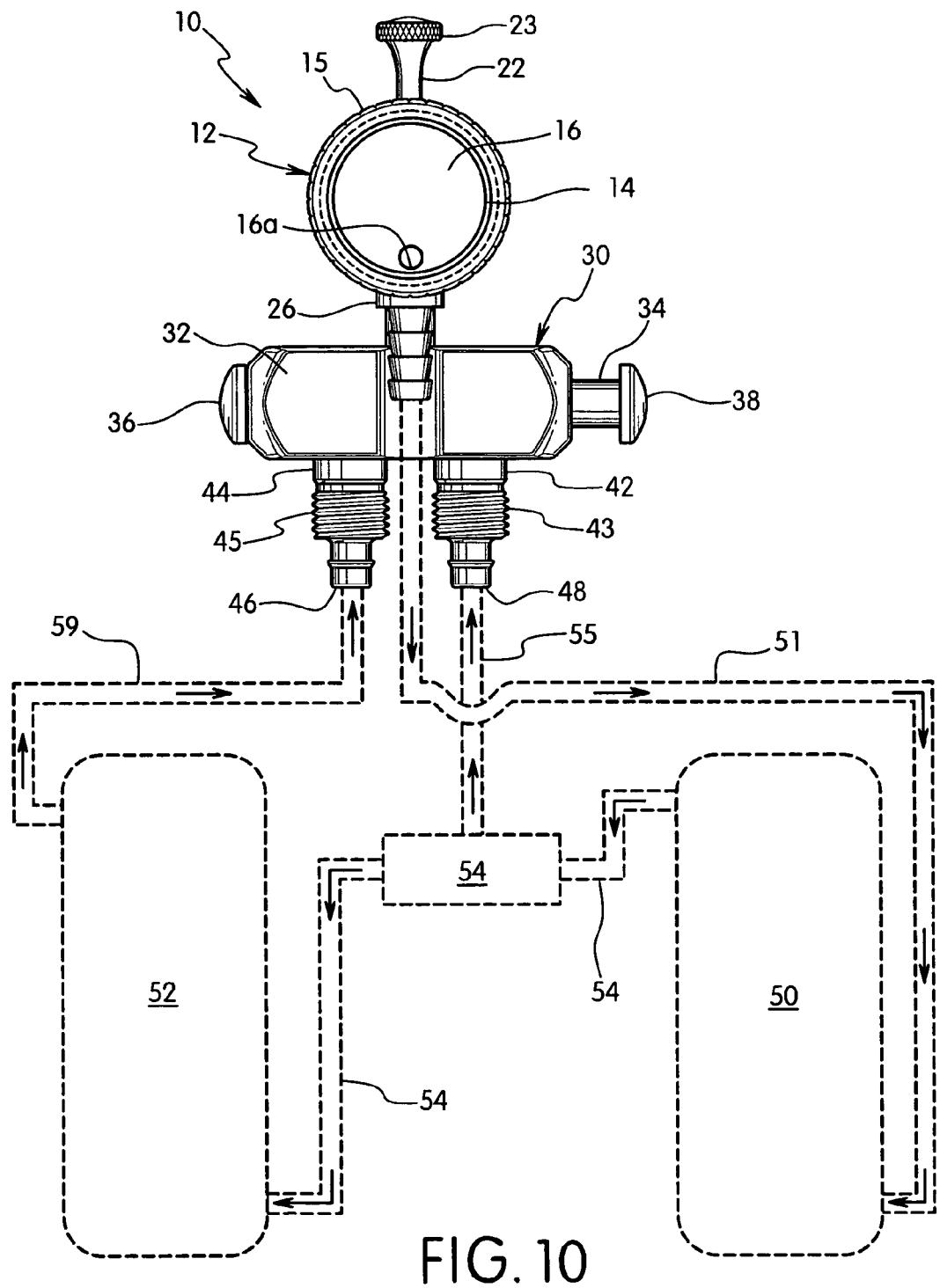
FIG. 10 is a design for a water treatment system incorporating the primary valve, a T-valve and two water treatment units.

FIGS. 1 to 9 are directed to the primary valve. FIG. 10 shows the primary valve incorporated into a water treatment system. The primary valve 10 is comprised of a first part 12 and a second part 30. The first part 12 is shown as being cylindrical but it can be of differing shapes. It has an upper section 14 and a lower section 18. The upper section has gripping enhancements 15 and an opening 16 for attachment to a source of water such as faucet. This section 14 rotates on lower section 18. Lower section 18 has an opening 17 for water that passes directly through first part 12. This would be untreated water that is being flowed directly to use. Channel 26 with opening 20 delivers the untreated water to one or more water treatment units (See FIG. 10). This is shown in more detail in FIG. 2. The exterior of channel 26 has a surface adapted to hold a flexible conduit line. FIG. 2 is a top plan view of the primary valve of FIG. 1 and shows the first part 12 in more detail. The opening 16 is threaded with treads 19 as is shown in FIGS. 8 and 9. Aperture 16a will either flow water directly through the first part or will flow the water through channel 26 to the water treatment units. This is controlled by pin shaft 22 with gripping surface 23. The operation of the valve section associated with this actuating pin shaft 22 is shown in more detail in FIGS. 8 and 9. FIG. 3 is a bottom plan view of the primary valve and shows a screen 24 that aerates the flowing water that flows directly through the first part 12. The views in these FIGS. 1 to 3 also show the second part 30 which is comprised of a second part body portion 32. This is the main section of the second part 30 and holds a sliding valve. The sliding valve is comprised of valve shaft 34 with end caps 36 and 38 and bore 34a. The end caps 36 and 38 serve as gripping means and limit the travel of valve shaft 34 in bore 34a. There are two inputs into the second part body portion 32. These are channels 42 and 44. Channel 42 has threads 43 for attaching a conduit from the water treatment units of FIG. 10. There is an opening 48 in channel 42. Also a part of the second part 30 is channel 44 with associated opening 46. Threads 45 attach a conduit to channel 44. Channel 39 flows treated water to exit fitting 40 which has a screen 43 to aerate the treated water prior to being dispensed for use at channel exit 29. This treated water usually has undergone two or more treatments in the water treatment units of FIG. 10.

FIG. 4 is a side elevation view and FIG. 5 a front elevation view of the primary valve 10. Shown in these views are the first part 12 and the second part 30. In the first part there is shown lower section 18 and upper section 14 which has gripping enhancements 15. Pin shaft 22 has a gripping surface 23. Pin shaft 22 actuates a valve section to divert the flow of input untreated water to treatment through channel 26 or to pass directly to exit 24 and use as untreated water. Channel 26 with opening 20 flows untreated water to the water treatment units shown in FIG. 10. Untreated water can be flowed directly from the first section 12 through exit 17. Second part 30 has second part body portion 32. Shaft 28 attaches the second part to the first part. There is shown as a part of the second part a valve shaft 34 and valve shaft grips 36 and 38. These are on opposite ends of valve shaft 34. Exit channel 39 flows the treated water from the second part 30 to dispensing aperture 29. Shown here and in more detail in FIGS. 8 and 9 is the dispensing aperture cap 40 with grip surface 41. Shown in FIG. 4 are channel 44, threads 45 and channel opening 46.

FIGS. 6 and 7 are cross-sectional views of the second part 30 with the valve shaft 34 in bore 34a. The valve shaft 34 is in the two different positions as shown in FIGS. 2 and 3. These views show channel 44 with threads 45 and input opening 46 and channel 42 with threads 43 and input opening 48. Also shown in these views are threads 31 attaching valve shaft grip 38 the valve shaft 34. The valve shaft 34 rides in bore 34a. The valve shaft 34 is divided into two sections by valve gaskets 33, 35 and 37. These gaskets can be O-ring gaskets. Valve gaskets 33 and 37 are adjacent to each end of valve shaft and valve gasket 35 is at about a midpoint. Each valve gasket provides a seal with valve shaft bore 34a to create chambers 60 and 62. Input channel 44 feeds into chamber 60 and input channel 48 feeds into chamber 62. Depending on the position of valve shaft 34 either chamber 62 feeds into exit channel 39 (FIG. 6) or feeds into exit channel 39.

FIGS. 8 and 9 are cross-sections of the primary valve 10 with input untreated water flowing directly through the first part 12 (FIG. 8) or being diverted to the second part 30 (FIG. 9). Untreated water enters into upper part 14 through opening 16 that has threads 19 for attaching to a faucet or the like. The water flows to opening 16a and to the valve chamber 21. Pin shaft 22 is spring loaded to the position in FIG. 8 for the water to flow directly through the first part 12 by spring 25. The untreated water flows through valve chamber 21 and through exit chamber 11 and screen 24 to exit at opening 17 as untreated water. FIG. 9 shows the input untreated water being flowed to the second part 30. The shaft pin 22 is adjusted so that the water cannot flow to chamber 11 as in FIG. 8 but must flow through channel 26 and to one or more water treatment units 50 and 52 (see FIG. 10). The treated water returning from the water treatment units flows into input channel 44 through aperture 46 and into bore 34a and chamber 60. The treated water then flows to use through channel 39 to exit at opening 43. Fitting 40 holds an aerating screen 41 and it threaded onto channel 39. A gasket 47 forms a seal of fitting 40 onto channel 39.

FIG. 10 shows the primary valve 10 as a part of a water treatment system. The parts of the primary valve 10 are the same as set out in detail in FIGS. 1 to 9. In the operation of this water treatment system untreated water from the primary valve 10 flows through conduit 51 to the first treatment unit 50. This treatment unit may function to purify the water or it can add a substance to the water. The so treated water then flows from water treatment unit 50 through conduit 53 to a valve 54. A preferred valve 54 is a T-valve. From valve 54 the water can either flow through conduit 55 to the second part 30 of the primary valve 10 or it can flow through conduit 57 to the a second treatment unit 52. The second treatment unit 52 like the first treatment unit 50 can further purify the water or it can add a substance to the water. If a substance was added to the water in the first treatment unit 50 a second substance can be added in the second treatment unit 52. The treated water from the second treatment unit flows through conduit 59 to inlet 46 of channel 44 of the second part 30. As shown in FIG. 10 treated water will flow directly from the first treatment unit 50 to the second part 30 through inlet 48 of channel 42. The treated water flows into bore 34a and into channel 39 and through outlet 43 to use. Depending on the position of valve shaft 34 in bore 34a treated water will either flow to the second part 30 through conduit 55 or to the second treatment unit conduit 59. Consequently the operation of the primary valve 10 is dependent in a first step on the position of pin shaft 22 which controls the flow of untreated water either directly through the first part 12 or diverted to the second part 30. In the second part the flow of treated water is controlled by the position of valve shaft 34 in bore 34a. This will determine if the water goes through only the first treatment unit or through the first treatment unit and the second treatment unit.

As noted the first and the second treatment steps can both be purification steps or substance addition steps. Usually the first treatment step will be a water purification step and the second treatment step a substance addition. In the water purification step the media used to purify the water can be any known purification media. However, the preferred purification media are available from Western Water International of Forestville, Md. under the AQUASPACE brand. The components that can be added to water include medicinals, minerals, vitamins, and substances to either raise or lower the Ph of the water. The Ph, for instance can be raised by the addition alkali or alkaline earth compounds. The Ph can be lowered through the addition of organic or inorganic acids. This can be accomplished by the use of the present water treatment systems which incorporate the present primary valve 10.

We claim:

1. A water treatment system, comprising a plurality of water treatment units, and a primary valve, the primary valve comprising a valve body, the valve body having a first part and a second part, the first part and the second part being attached, the first part comprising an inlet for untreated water and an outlet for untreated water, the first part further having a diverter section to allow the untreated water entering the first part to be diverted to a channel connecting to the water treatment units of the water treatment system, the second part comprising an elongated section having at least a first channel and a second channel for receiving treated water from the water treatment units, the second part incorporating a slideable shaft in a bore in the elongated section and a connected outlet for treated water, the slideable shaft connecting at least one of the at least first channel and a second channel to the outlet for treated water, untreated water flows from a channel of the first part of the valve body of the primary valve to a conduit to a first water treatment unit, a treated water flows from the first water treatment unit through a conduit to a secondary valve which flows the treated water to one of a conduit to a second water treatment unit or to a channel input to the second part of the valve body of the primary valve for flow through the second part of the valve body of the primary valve and to the outlet from the second part of the primary valve for subsequent dispensing; when flowed through the conduit to the second water treatment unit the treated water exiting from the second water treatment unit through a conduit and into a channel of the second part of the valve body of the primary valve for subsequent dispensing from the outlet for treated water, wherein the first water treatment unit removes substances from the untreated water and the second water treatment unit adds at least one substance to water from the first treatment unit.

2. A water treatment system as in claim 1 wherein the primary valve first part inlet for water has a structure for attaching to a sink faucet outlet.

3. A water treatment system as in claim 1 wherein, the slideable shaft has at least two passages through the slideable shaft, the slideable shaft is moveable in the bore at least from a first position to a second position, in a first position the slideable shaft connects one of the at least a first channel and a second channel to the outlet for treated water and in another position connects the other of the at least first channel and second channel to the outlet for treated water.

4. A water treatment system as in claim 3 wherein the slideable shaft is an elongated structure with a seal adjacent each end.

5. A water treatment system as in claim 4 wherein the slideable shaft has a seal between the seals adjacent each end.

6. A water treatment system as in claim 5 wherein the seal between the seals adjacent each end is at about a midpoint between the seals adjacent each end with a slideable shaft first passage and a slideable shaft second passage between the about a midpoint seal and the adjacent end seal.

7. A water treatment system as in claim 3 wherein the slideable shaft has an end gripping member on each end.

8. A water treatment system as in claim 1 wherein the secondary valve is a T-valve which receives treated water from the at least first water treatment unit and flows this treated water to one of the second part of the primary valve or the at least second water treatment unit.

9. A water treatment system as in claim 8 wherein the first treatment unit is connected to the second part of the primary valve by means of the secondary valve whereby treated water flows from the first treatment unit into one of the first channel and second channel of the second part elongated section and then to the outlet for treated water.

10. A water treatment system as in claim 1 wherein treated water from the first water treatment unit flows through the secondary valve to the second water treatment unit and into one of the first channel and the second channel, subsequently flowing to the second part elongated section and through an aligned passage in the slideable shaft and thereafter to the outlet for treated water.

11. A water treatment system as in claim 1 wherein in the second part, the slideable shaft is moveable at least from a first position to a second position, in a first position a passage in the slideable shaft connects one of the at least a first and a second channel to the outlet for treated water and in another position connects another passage in the slideable shaft of the at least first and second channels to the outlet for treated water.

12. A water treatment system as in claim 11 wherein, the slideable shaft has two passages therethrough, the passages separated along the slideable shaft by a seal, each passage of the slideable shaft in communication with the at least a one of the first channel and the second channel and with the connected outlet for treated water.

13. A water treatment system as in claim 12 wherein the slideable shaft is an elongated structure with a seal adjacent each end.

14. A water treatment system as in claim 13 wherein the slideable shaft has a seal between the seals adjacent each end.

15. A water treatment system as in claim 1 wherein the at least one added substance is an alkali or alkaline earth compound to raise the pH of the water.

* * * * *